(12) United States Patent
Liu

(10) Patent No.: US 7,424,080 B1
(45) Date of Patent: Sep. 9, 2008

(54) METHOD AND SYSTEM FOR PROVIDING JITTER-FREE TRANSMISSIONS FOR DEMODULATED DATA STREAM

(75) Inventor: Binfan Liu, Livermore, CA (US)

(73) Assignee: Broadlogic Network Technologies, Inc., San Jose, CA (US)

( * ) Notice: Subject to any disclaimer, the term of this patent is extended or adjusted under 35 U.S.C. 154(b) by 694 days.

(21) Appl. No.: 10/631,497

(22) Filed: Jul. 31, 2003

(51) Int. Cl.
*H04L 7/00* (2006.01)
*H03D 1/00* (2006.01)

(52) U.S. Cl. .................................. 375/371; 375/340

(58) Field of Classification Search ............... 375/326, 375/362, 369, 371, 354, 340, 316; 370/516
See application file for complete search history.

(56) References Cited

U.S. PATENT DOCUMENTS

| | | | | |
|---|---|---|---|---|
| 5,625,652 A | * | 4/1997 | Petranovich | 375/355 |
| 5,671,253 A | * | 9/1997 | Stewart | 375/316 |
| 6,191,649 B1 | * | 2/2001 | Sugita et al. | 329/304 |
| 2001/0022823 A1 | * | 9/2001 | Renaud | 375/359 |
| 2002/0181459 A1 | * | 12/2002 | Ohta et al. | 370/389 |

* cited by examiner

*Primary Examiner*—Kevin M Burd
(74) *Attorney, Agent, or Firm*—Townsend and Townsnend and Crew

(57) ABSTRACT

A system for providing jitter-free transmissions for demodulated data streams is disclosed. In one embodiment, the system includes a demodulator, a packet processor and a timing generator. The demodulator further includes a timing recovery circuit. Output signals from the timing recovery circuit and demodulated output signals from the demodulator are provided to the timing generator. Using these signals, the timing generator then generates an output timing signal. Demodulated data are provided to the packet processor as input. The demodulated data are then output by the packet processor under the control of the output timing signal from the timing generator.

30 Claims, 4 Drawing Sheets

METHOD AND SYSTEM FOR PROVIDING JITTER-FREE TRANSMISSIONS FOR DEMODULATED DATA STREAM

BACKGROUND OF THE INVENTION

The present invention relates generally to a receiver for digital communications over any media and, more specifically, to a method and system for removing jitter from demodulated data streams subject to variable delays and for correcting timestamps to accurately reflect the temporal location of selected packets relative to other packets.

There have long been needs in the art to transmit real-time media signals, such as, voice, audio and/or video, from one location to another using digital communications systems, such as, hybrid fiber coax (HFC), satellite and terrestrial broadcast systems. At the receiver locations, these media signals require synchronization of the time reproduction in order to allow such signals to be rendered suitable for listening and/or viewing.

Under conventional prior art approaches, the time information, such as a sequence number, timestamp or clock reference, is inserted into the packetized media data. For example, MPEG (moving picture experts group) receiver systems synchronize their internal clocks to received timestamp values, known as program clock reference (PCR) values, by sampling the PCR values, calculating the difference between the received PCR values and an internal clock value, and then synchronizing the internal clock according to the calculated difference. However, variable delays may be introduced. These delay variations include, for example, demodulating/decoding time in demodulators, channelized delays in multichannel systems, and packetization jitter. Variations in arrival times to a PCR sampler produce PCR jitter and degrade the quality of service (QoS).

Under another approach used to reduce jitters, both transmitters and receivers use a common clock source, such as, global positioning systems. By synchronizing to the common clock, it is possible for a receiver to create a substantially accurate timestamp with a transmitter. However, both the transmitter and the receiver have to be equipped with global positioning system receivers. A global positioning system receiver includes an antenna, associated circuitry and/or software which may increase the system complexity and cost.

Hence, it would be desirable to have a system that is capable of providing jitter-free transmissions in a more efficient manner.

BRIEF SUMMARY OF THE INVENTION

In view of the foregoing disadvantages inherent in the known approaches of implementing jitter removal and timestamp correction, the present invention provides, amongst other things, a new jitter and timestamp management system for real-time media signals including, without limitation, voice, video, audio, other voice-band signals (such as modem signals, fax signals), and/or any combination or subset of these or other signals, whether alone or in combination with other signals. According to one aspect of the present invention, it is not necessary for time information, such as PCR, to be embedded in data packets.

According to one aspect, a demodulation receiver extracts the modulation symbol rate from the timing recovery circuit. Since the symbol rate is synchronized with the transmitter, the receiver can maintain the synchronized timing to output the demodulated data stream. One advantage of having the symbol rate synchronized to the transmitter is that it eliminates the need for reconstruction of clock reference in a jitter-prone environment. The present invention can be employed regardless of whether the demodulated data are either packetized data stream or seamless data stream as long as the timing recovery circuit can be synchronized with the transmitting symbol rate.

According to a second aspect, the foregoing timing is adjusted due to the long-run timing accuracy of the recovered symbol clock. The timing error signal reflects the time difference between data arrival and departure of the demodulated signals.

According to another aspect, a demodulator can generate the output timing at which both the demodulated data stream and the demodulated packet stream can be output jitter-free to other parts of the system.

According to yet another aspect, the generated output timing can be used to make timestamp corrections on packets bearing time information so that the correct timestamps accurately reflect the temporal location of packets.

According to one embodiment, a system for providing jitter-free transmissions for demodulated data streams is disclosed. The system includes a demodulator configured to generate demodulated data, the demodulator further comprising a timing recovery circuit configured to provide a number of sampled modulation symbols and corresponding sampling signals; a processor configured to receive the demodulated data from the demodulator at an input rate, the processor further configured to generate an output; and a timing generator configured to receive the sampling signals and input rate information, the timing generator further configured to generate an output rate using the sampling signals and the input rate information; wherein the output rate is used to control output timing of the processor.

In one embodiment, the timing generator includes a timestamp counter configured to generate timestamp information; a differentiator configured to calculate a timestamp difference between two successive modulation symbols using the corresponding sampling signals; a switch coupling the timestamp counter and the differentiator, the switch being controlled by the sampling signals; a filter configured to receive the timestamp difference and calculate a modulation symbol interval using the timestamp difference; a mapper configured to receive the modulation symbol interval and determine a modulation symbol rate and map the modulation symbol rate to a base rate; wherein the base rate is used to generate the output rate.

Optionally, the system further comprises a circuit configured to adjust the base rate using the output rate and the input rate. In one implementation, the mapper is a symbol rate mapper. The symbol rate mapper is configured to map the modulation symbol rate to the base rate based on a coding rate used by a forward error correction module included in the demodulator. The circuit further comprises a first differentiator configured to calculate a first timestamp difference between two successive pieces of demodulated data forwarded to the processor; a switch coupling the first differentiator and the timestamp counter, the switch being controlled by the input rate; a second differentiator configured to calculate a second timestamp difference between two successive pieces of output from the processor; a switch coupling the second differentiator and the timestamp counter, the switch being controlled by the output rate; and a circuit configured to generate an adjustment using the first and second timestamp differences; wherein the adjustment is combined with the base rate to generate the output rate.

In another implementation, the mapper is a packet rate mapper. The packet rate mapper is configured to map the modulation symbol rate to the base rate based on a packet size and a coding rate used by a forward error correction module included in the demodulator. The circuit configured to adjust the base rate using the output rate and the input rate further comprises a packet counter configured to generate a packet count signal upon reaching a predetermined packet count, the packet counter being incremented in accordance with the input rate; a first differentiator configured to calculate a first timestamp difference between two successive pieces of demodulated data forwarded to the processor; a switch coupling the first differentiator and the timestamp counter, the switch being controlled by the packet count signal; a second differentiator configured to calculate a second timestamp difference between two successive pieces of output from the processor; a switch coupling the second differentiator and the timestamp counter, the switch being controlled by the output rate; and a circuit configured to generate an adjustment using the first and second timestamp differences; wherein the adjustment is combined with the base rate to generate the output rate.

Optionally, the output of the processor includes timestamp information. The timestamp information and the output rate are used to generate a correction offset and the timestamp information is adjusted using the correction offset.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

The present invention in the form of one or more exemplary embodiments will now be described. Real-time media data are modulated before they are transmitted by a transmitter as modulated signals. The media data may or may not be packetized. At a receiver, a typical demodulator provides a number of functionality, such as, automatic gain control, timing recovery, equalization and carrier recovery, forward error correction and packet encapsulation. From the modulated signals, the demodulator recovers the embedded packets. The packets including media signal information are then forwarded to other parts of the system for processing. The processed packets are further delivered to a media play (or display) system.

The purpose of the timing recovery circuit is to obtain symbol synchronization. Once the timing recovery circuit has been locked, the receiving end remains substantially synchronized to the transmitting end. Provided with synchronized symbols, it is possible to make substantially accurate and appropriate measurements and corrections in packet delay variations.

Figure 1:
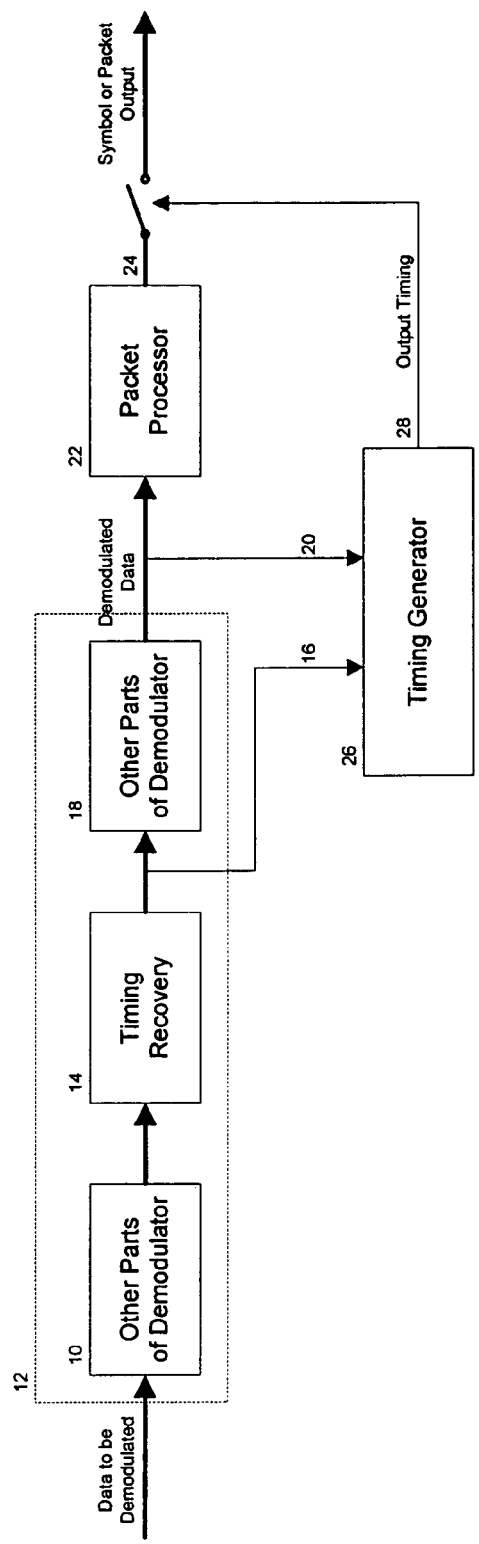
FIG. 1 is a simplified block diagram illustrating a system capable of removing jitters and correcting timestamps according one exemplary embodiment of the present invention.

FIG. 1 shows an exemplary embodiment of a circuit for removing jitters and correcting timestamps by synchronizing the symbol rates with a transmitter. The transmitter generates symbols uniformly, i.e., the successive time period between two symbols is constant (except for drifts and jitters). The inputs to the demodulator 12 are data to be demodulated at a modulation symbol rate used by the transmitter. The modulation signals include, without limitation, BPSK, QPSK, or QAM signals. After the timing recovery circuit 14 synchronizes with the transmitter, it outputs sampled modulation symbols to other parts of the demodulator 18. The timing recovery circuit 14 also sends a sampling signal 16 to the timing generator block 26 whenever it samples a modulation symbol. The modulation symbols go through other parts of the demodulator 18 which outputs the demodulated data symbols (or bytes) to the packet processor 22. The demodulator 12 also sends a demodulation output signal 20 to the timing generator 26 when the demodulator 12 outputs the demodulated data symbols (or bytes). The demodulated symbols are encapsulated within packets or bytes depending on the operation mode used by the packet processor 22. The packet processor 22 then outputs the demodulated packets or bytes to other parts of the system based on the output timing signal 28 produced by the timing generator 26. It should be noted that while other parts of the demodulator 10, 18 are not shown in detail, based on the disclosure and teachings provided herein and general industry knowledge, a person of ordinary skill in the art will be familiar with the components that are commonly found in such other parts of the demodulator 10, 18.

Figure 2:
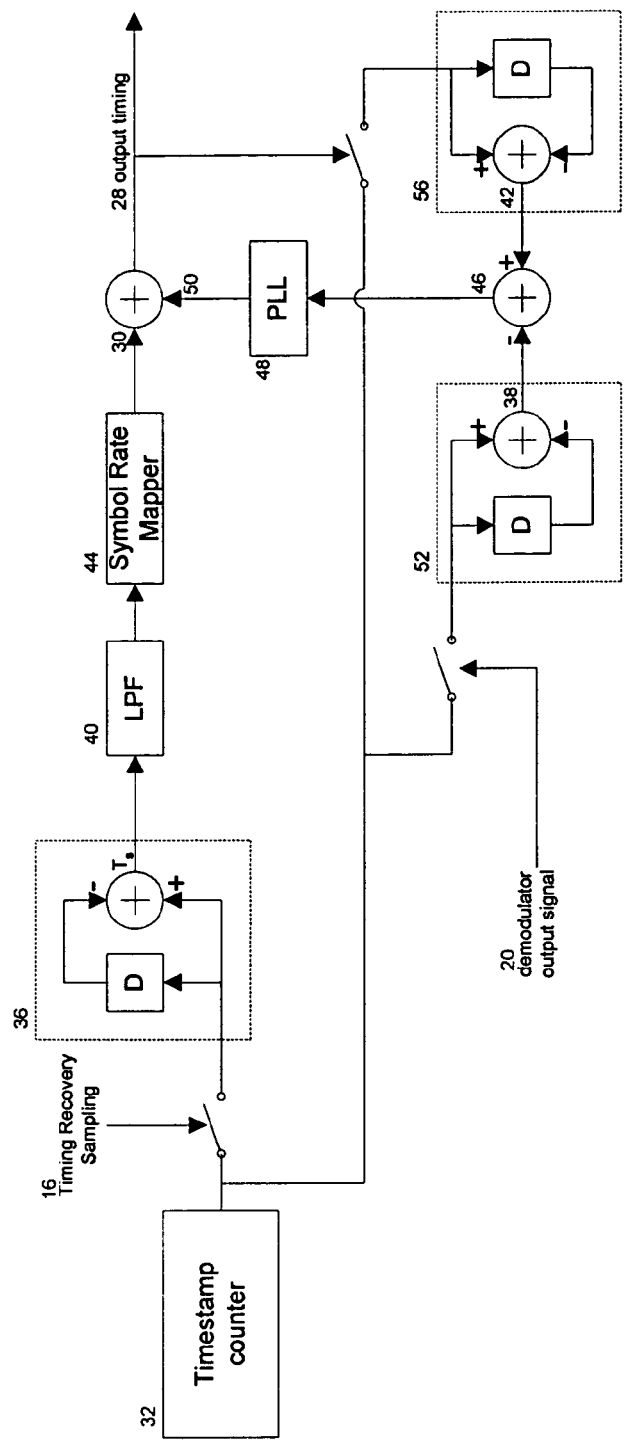
FIG. 2 is a simplified block diagram illustrating an exemplary embodiment of an output timing generator for continuous jitter-free packet symbol output in accordance with the present invention.

FIG. 2 shows an exemplary embodiment of the timing generator 26 for providing continuous jitter-free packet byte (or symbol) outputs. The timing generator 26 takes the timing sampling signals 16 from the timing recovery circuit 14 and the demodulated output signals 20 from other parts of the demodulator 18 as inputs. The output from the timing generator 26 is output timing signal 28. When the timing generator 26 receives a sampling signal 16, the differentiator 36 latches the state TS(t) of the timestamp counter 32 and calculates the timestamp difference $T_s$ between the current and previous modulation samples, $T_s=TS(t)-TS(t-1)$, where TS(t) is the state of the timestamp counter 32 at sampling time t. In one exemplary implementation, the timestamp counter 32 is a free-running counter operating at a predetermined frequency, such as, 27 MHz. Other frequencies can be used as the predetermined frequency for the free-running counter. The timestamp difference $T_s$ is passed through a low-pass filter (LPF) 40 in order to obtain the modulation symbol intervals. In turn, the modulation symbol intervals are used to determine the modulation symbol rate which is used by the transmitter. The modulation symbol rate is then mapped to the information symbol rate (or bit rate) by the symbol rate mapper 44 using the coding rate of the forward error correction (FEC) used in other parts of the demodulator 18. As a result, the information symbol rate (or bit rate) is synchronized with that of the transmitter and is used as the base rate 30 to control the timing of data outputs from the packet processor 22. Since the information symbol rate uses a bit basis, the base rate 30 may be further defined on a byte or packet basis. Effectively, by performing the foregoing, operations are switched from the symbol domain to the packet domain. Based on the disclosure and teachings provided herein, a person of ordinary skill in the art will know and appreciate how to design the low pass filter and obtain the byte rate from the modulation symbol rate.

The foregoing base rate 30 may need to be adjusted due to various variations, such as, drift and/or jitter of clock frequency at the transmitter, processing jitter and/or limited precision of hardware/software implementation at the receiver. There is an output buffer in the packet processor 22. The differentiator 52 generates the timestamp difference 38 between two successive data outputs of the demodulator 12. As shown in FIG. 2, the demodulator output signal 20 controls a switch which provides input from the timestamp counter 32 to the differentiator 52. The demodulator 12 generates the demodulator output signal 20 every time corresponding demodulated data is outputted. As a result, the differentiator 52 is able to generate the timestamp difference 38 between two successive data outputs of the demodulator 12 using the two corresponding successive demodulator output signals 20. It should be noted that the term "successive" as used herein is not limited to two data outputs with one directly following the other; instead, the term "successive" may describe situations in which one data output follows another data output but with one or more other data outputs in between. Similarly, the differentiator 56 generates the timestamp difference 42 between two successive data outputs of the packet processor 22 using the two corresponding successive output timing signals 28. The two differences 38, 42 are then used to generate the timing error signal 46 that is then fed into a phase-locked loop (PLL) 48. The output 50 of the PLL and the base rate 30 are then combined together to generate the output timing signal 28 for the packet processor 22 to output a symbol (or byte). Based on the disclosure and teachings provided herein, a person of ordinary skill in the art will know and appreciate how to design the PLL in accordance with the present invention.

In an exemplary embodiment where the outputs of the packet processor 22 are jitter-free symbol (byte) transmissions, the output timing signal 28 is directly used to control the time when a symbol (byte) should be transmitted to other parts of the system.

Figure 3:
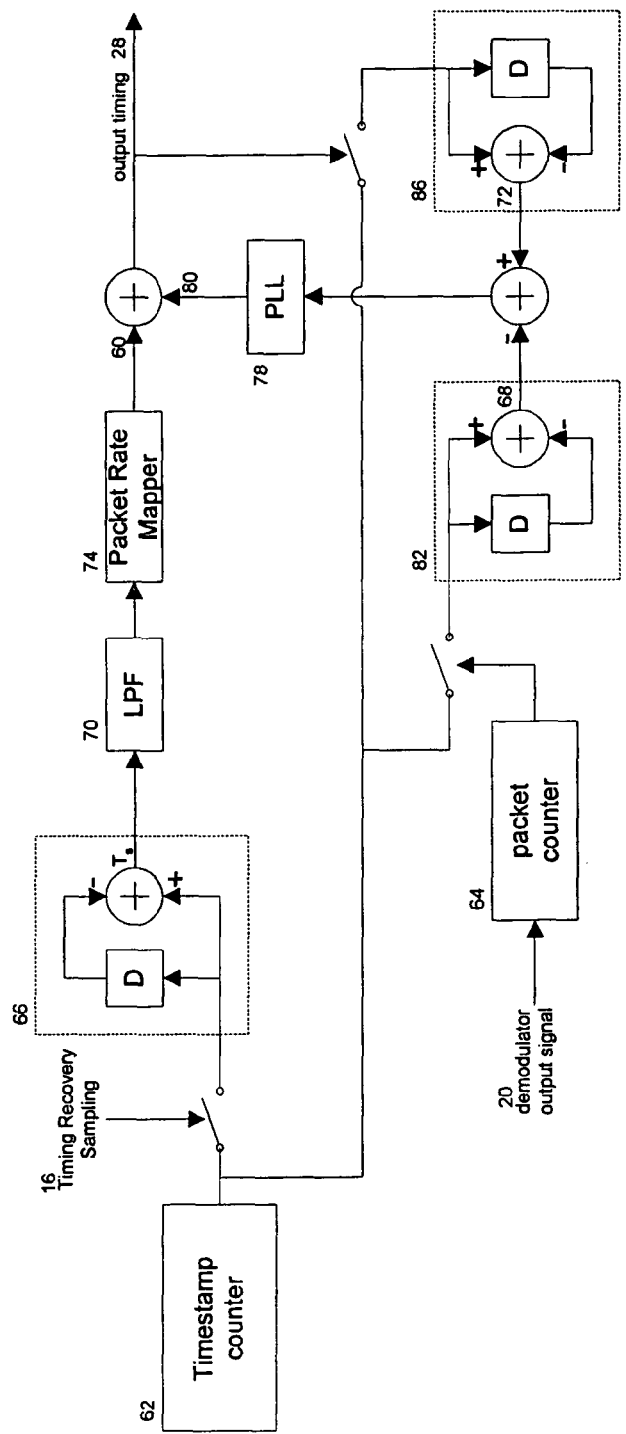
FIG. 3 is a simplified block diagram illustrating an exemplary embodiment of an output timing generator for packet outputs in accordance with the present invention.

FIG. 3 shows an exemplary embodiment of the timing generator 26 for providing packet outputs. The timing generator 26 takes timing sampling signals 16 and demodulated output signals 20 to generate output timing signals 28. Once the output timing signal 28 has been determined, the timing information can be used for either jitter-free packet transmissions or transmissions with timestamps.

Referring to FIG. 3, when the timing generator 26 receives a sampling signal 16, the differentiator 66 calculates the timestamp difference T, between the current and previous modulation samples, $T_s=TS(t)-TS(t-1)$, where TS(t) is the state of the timestamp counter 62 at the sampling time t. The timestamp difference $T_s$ is passed through a low-pass filter (LPF) 70 in order to obtain the modulation symbol intervals. In turn, the modulation symbol intervals are used to determine the modulation symbol rate used by the transmitter. The modulation symbol rate is then mapped to a packet rate by using the packet size and the coding rate of the forward error correction (FEC) in other parts of the demodulator 18. As a result, the packet rate is synchronized with that of the transmitter and is used as the base rate 60 to control the timing of packet outputs from the packet processor 22. There is a packet counter 64 that is used to count packets for the data outputs of the demodulator 12. As shown in FIG. 3, the demodulator output signals 20 are used to increment the packet counter 64. Once the packet counter 64 reaches a predetermined packet count, the packet counter 64 activates a switch coupling the timestamp counter 62 and the differentiator 82. As a result, the differentiator 82 generates the timestamp difference 68 between two successive packet outputs of the demodulator 12. The number of packets in each packet output corresponds to the predetermined packet count. It should be noted that the predetermined packet count can be chosen on an arbitrary basis which may depend on various factors including, for example, design and/or system constraints. Based on the disclosure and teachings provided herein, a person of ordinary skill in the art will appreciate how to arrive at an appropriate predetermined packet count. Similarly, the differentiator 86 generates the timestamp difference 72 between two successive packet outputs of the packet processor 22. The two differences 68, 72 are then used to generate a timing error signal that is then fed into a phase-locked loop (PLL) 78. The output 80 of the PLL 78 and the base rate 60 are then combined to provide the output timing signal 28 for packets. Based on the disclosure and teachings provided herein, a person of ordinary skill in the art will know and appreciate how to design the PLL and obtain the packet rate from the modulation symbol rate.

In an exemplary embodiment where the outputs of the packet processor 22 are jitter-free packet transmission, the output timing signal 28 is directly used to control the time when a packet should be transmitted to other parts of the system.

In an exemplary embodiment where the outputs of the packet processor 22 are packet transmissions with timestamp information, information relating to the output timing signal 28 is attached to the corresponding packet to be transmitted. The packets are transmitted at a time controlled by other parts of the system. In another exemplary embodiment where there are multi-channel demodulators, information relating to the output timing signal 28 and channel identification (ID) is attached to the corresponding packet to be transmitted. As a result, when other parts of the system receives a packet, channel and timestamp information associated with the received packet is available.

Figure 4:
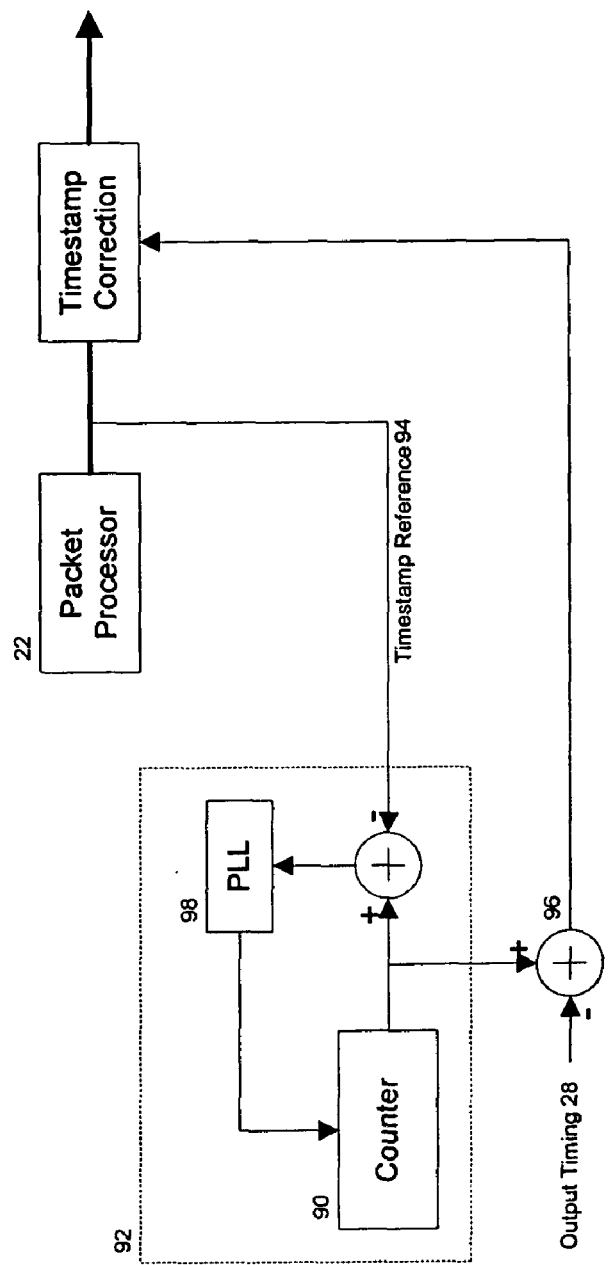
FIG. 4 is a simplified block diagram illustrating a system capable of correcting timestamp reference in accordance with an exemplary embodiment of the present invention.

In an exemplary embodiment where outputs of the packet processor 22 are packet transmissions with embedded timestamp reference, such as, the PCR value of MPEG transport packets, the free-running timestamp counter 62 is a timestamp counter 92 controlled by the timestamp reference 94 as shown in FIG. 4. An error timestamp signal is generated as the difference between the state of the counter 90 and the timestamp reference value 94 at the time that the corresponding packet with the timestamp reference 94 should be transmitted from packet processor 22 for jitter-free transmission. The error timestamp signal is fed to a phase-locked loop 98 in order to synchronize the timestamp counter 90 with the timestamp reference 94.

In another exemplary embodiment where packets are output at a time other than the output timing signal 28 mentioned above and controlled by other parts of the system, the synchronized timestamp counter 92 is used to make a correction of the timestamp reference 94 for a packet. As a result, other parts of the system can have a correct timestamp reference for playing (displaying) the media data. The correction offset 96 of the timestamp reference 94 is the difference between the output timing signal 28 and the actual output time of the corresponding packet as represented by the state of the timestamp counter 90. Based on the disclosure and teachings provided herein, a person of ordinary skill in the art will know and appreciate how to correct the timestamp reference and design the phase-locked loop.

In an exemplary embodiment where the timing recovery circuit 14 is implemented to process a block of modulation symbols for one channel in a multi-channel demodulator, the differentiator 36 (or 66) generates the timestamp difference between two blocks of modulation symbols for one channel. The mapper 44 (or 74) then maps the block rate of the modulation symbols to a byte rate (or packet rate) to obtain the base rate for the packet processor 22 to deliver its output.

It should be understood that the present invention can be implemented in the form of control logic using software, hardware or a combination thereof. It should also be understood that the present invention can be implemented in an integrated circuit or otherwise incorporated as part of a communications system. Based on the disclosure and teachings provided herein, a person of ordinary skill in the art will know of other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for providing jitter-free transmissions for demodulated data streams, comprising:
    a demodulator configured to generate demodulated data and corresponding demodulated output signals, the demodulator further comprising a timing recovery circuit configured to provide a plurality of sampled modulation symbols and corresponding sampling signals;
    a processor configured to receive the demodulated data and generate an output; and
    a timing generator configured to generate output timing signals using the sampling signals and the demodulated output signals, wherein the timing generator includes a timestamp counter configured to generate timestamp information, and a differentiator configured to calculate a timestamp difference between two successive modulation symbols using the corresponding sampling signals;
    wherein the output timing signals are used to control timing of generation of the output of the processor.

2. The system of claim 1 wherein the output of the processor includes timestamp information;
    wherein the timestamp information and the output timing signals are used to generate a correction offset; and
    wherein the timestamp information is adjusted using the correction offset.

3. The system of claim 1 wherein the demodulated data include a plurality of symbols.

4. The system of claim 1 wherein the demodulated data include a plurality of bytes.

5. The system of claim 1 wherein the timing generator includes:
    a switch coupling the timestamp counter and the differentiator, the switch being controlled by the sampling signals;
    a filter configured to receive the timestamp difference and calculate a modulation symbol interval using the timestamp difference;
    a mapper configured to receive the modulation symbol interval and determine a modulation symbol rate and map the modulation symbol rate to a base rate;
    wherein the base rate is used to generate the output timing signals.

6. The system of claim 5 wherein the timestamp counter is a free-running counter.

7. The system of claim 5 wherein the filter includes a low-pass filter.

8. The system of claim 5 further comprising:
    a circuit configured to adjust the base rate using the output timing signals and the demodulated output signals.

9. The system of claim 8 wherein the mapper is a symbol rate mapper; and
    wherein the symbol rate mapper is configured to map the modulation symbol rate to the base rate based on a coding rate used by a forward error correction module included in the demodulator.

10. The system of claim 9 wherein the circuit comprises:
    a first differentiator configured to calculate a first timestamp difference between two successive pieces of demodulated data;
    a switch coupling the first differentiator and the timestamp counter, the switch being controlled by the demodulated output signals;
    a second differentiator configured to calculate a second timestamp difference between two successive pieces of output from the processor;
    a switch coupling the second differentiator and the timestamp counter, the switch being controlled by the output timing signals; and
    a circuit configured to generate an adjustment using the first and second timestamp differences;
    wherein the adjustment is combined with the base rate to generate the output timing signals.

11. The system of claim 8 wherein the mapper is a packet rate mapper; and
    wherein the packet rate mapper is configured to map the modulation symbol rate to the base rate based on a packet size and a coding rate used by a forward error correction module included in the demodulator.

12. The system of claim 11 wherein the circuit comprises:
    a packet counter configured to generate a packet count signal upon reaching a predetermined packet count, the packet counter being incremented by the demodulated output signals;
    a first differentiator configured to calculate a first timestamp difference between two successive pieces of demodulated data;
    a switch coupling the first differentiator and the timestamp counter, the switch being controlled by the packet count signal;
    a second differentiator configured to calculate a second timestamp difference between two successive pieces of output from the processor;
    a switch coupling the second differentiator and the timestamp counter, the switch being controlled by the output timing signals; and
    a circuit configured to generate an adjustment using the first and second timestamp differences;
    wherein the adjustment is combined with the base rate to generate the output timing signals.

13. The system of claim 1 wherein the demodulator is further configured to receive a plurality of input data streams from a plurality of corresponding channels;
    wherein the plurality of input data streams include corresponding channel identification information; and
    wherein the system is configured to process one input data stream at a time.

14. A communication system incorporating the system as recited in claim 1.

15. An integrated circuit incorporating the system as recited in claim 1.

16. A system for providing jitter-free transmissions for demodulated data streams, comprising:
    a demodulator configured to generate demodulated data, the demodulator further comprising a timing recovery circuit configured to provide a plurality of sampled modulation symbols and corresponding sampling signals;
    a processor configured to receive the demodulated data from the demodulator at an input rate, the processor further configured to generate an output; and
    a timing generator configured to receive the sampling signals and input rate information, the timing generator further configured to generate an output rate using the sampling signals and the input rate information;
    wherein the timing generator includes a differentiator configured to calculate a timestamp difference between two successive modulation symbols using the corresponding sampling signals;
    wherein the output rate is used to control output timing of the processor.

17. The system of claim 16 wherein the output of the processor includes timestamp information;
    wherein the timestamp information and the output rate are used to generate a correction offset; and
    wherein the timestamp information is adjusted using the correction offset.

18. The system of claim 16 wherein the demodulated data include a plurality of symbols.

19. The system of claim 16 wherein the demodulated data include a plurality of bytes.

20. The system of claim 16 wherein the timing generator includes:
    a timestamp counter configured to generate timestamp information;
    a switch coupling the timestamp counter and the differentiator, the switch being controlled by the sampling signals;
    a filter configured to receive the timestamp difference and calculate a modulation symbol interval using the timestamp difference;
    a mapper configured to receive the modulation symbol interval and determine a modulation symbol rate and map the modulation symbol rate to a base rate;
    wherein the base rate is used to generate the output rate.

21. The system of claim 20 wherein the timestamp counter is a free-running counter.

22. The system of claim 20 wherein the filter includes a low-pass filter.

23. The system of claim 20 further comprising:
    a circuit configured to adjust the base rate using the output rate and the input rate.

24. The system of claim 23 wherein the mapper is a symbol rate mapper; and
    wherein the symbol rate mapper is configured to map the modulation symbol rate to the base rate based on a coding rate used by a forward error correction module included in the demodulator.

25. The system of claim 24 wherein the circuit comprises:
    a first differentiator configured to calculate a first timestamp difference between two successive pieces of demodulated data forwarded to the processor;
    a switch coupling the first differentiator and the timestamp counter, the switch being controlled by the input rate;
    a second differentiator configured to calculate a second timestamp difference between two successive pieces of output from the processor;
    a switch coupling the second differentiator and the timestamp counter, the switch being controlled by the output rate; and
    a circuit configured to generate an adjustment using the first and second timestamp differences;
    wherein the adjustment is combined with the base rate to generate the output rate.

26. The system of claim 23 wherein the mapper is a packet rate mapper; and
    wherein the packet rate mapper is configured to map the modulation symbol rate to the base rate based on a packet size and a coding rate used by a forward error correction module included in the demodulator.

27. The system of claim 26 wherein the circuit comprises:
    a packet counter configured to generate a packet count signal upon reaching a predetermined packet count, the packet counter being incremented in accordance with the input rate;
    a first differentiator configured to calculate a first timestamp difference between two successive pieces of demodulated data forwarded to the processor;
    a switch coupling the first differentiator and the timestamp counter, the switch being controlled by the packet count signal;
    a second differentiator configured to calculate a second timestamp difference between two successive pieces of output from the processor;
    a switch coupling the second differentiator and the timestamp counter, the switch being controlled by the output rate; and
    a circuit configured to generate an adjustment using the first and second timestamp differences;
    wherein the adjustment is combined with the base rate to generate the output rate.

28. The system of claim 16 wherein the demodulator is further configured to receive a plurality of input data streams from a plurality of corresponding channels;
    wherein the plurality of input data streams include corresponding channel identification information; and
    wherein the system is configured to process one input data stream at a time.

29. A communication system incorporating the system as recited in claim 16.

30. An integrated circuit incorporating the system as recited in claim 16.

* * * * *